(12) United States Patent
Abro et al.

(10) Patent No.: US 7,581,774 B2
(45) Date of Patent: Sep. 1, 2009

(54) CENTER CONSOLE ASSEMBLY HAVING A RAMPED LOCATING TAB

(75) Inventors: Lauren M. Abro, Farmington Hills, MI (US); Charan Singh Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 83 days.

(21) Appl. No.: 11/935,723

(22) Filed: Nov. 6, 2007

(65) Prior Publication Data
US 2009/0115215 A1 May 7, 2009

(51) Int. Cl.
*B60R 7/06* (2006.01)
(52) U.S. Cl. .................. 296/37.8; 296/24.34
(58) Field of Classification Search ............ 296/37.8, 296/24.34; 224/539
See application file for complete search history.

(56) References Cited

U.S. PATENT DOCUMENTS

| | | |
|---|---|---|
| 4,600,255 A | 7/1986 | Dubarko |
| 5,863,089 A | 1/1999 | Ignarra et al. |
| 6,129,400 A | 10/2000 | Jakubiec et al. |
| 6,168,059 B1 | 1/2001 | Salenbauch et al. |
| 6,367,857 B2 | 4/2002 | Kifer et al. |
| 6,497,443 B2 | 12/2002 | Worrell et al. |
| 6,669,258 B1 | 12/2003 | Kato et al. |
| 6,682,116 B1 | 1/2004 | Okumura et al. |
| 6,749,079 B2 | 6/2004 | Katagiri et al. |
| 6,851,736 B1 | 2/2005 | Klopp, III et al. |
| 7,114,772 B2 | 10/2006 | Kobayashi et al. |
| 7,168,750 B2 | 1/2007 | Hutek et al. |
| 7,192,070 B2 | 3/2007 | Radu et al. |
| 7,237,816 B1 | 7/2007 | Singh et al. |
| 2007/0069544 A1 | 3/2007 | Sturt et al. |
| 2008/0079279 A1* | 4/2008 | Spykerman et al. ...... 296/24.34 |

* cited by examiner

*Primary Examiner*—Joseph D Pape
(74) *Attorney, Agent, or Firm*—Gifford, Krass, Sprinkle, Anderson & Citkowski, P.C.

(57) ABSTRACT

A center console assembly for a motor vehicle includes a pair of side walls generally parallel and spaced apart from each other; a storage compartment extending between the side walls; and a tray supported on the side walls. A tab extends outwardly from at least one of the side walls and extends into a recess formed in the tray to retain the tray in a retained position to prevent the tray from sliding along the side walls. The tab has a ramped leading surface that facilitates insertion of the tab into the recess as the tray is moved along the side walls toward the retained position.

14 Claims, 3 Drawing Sheets

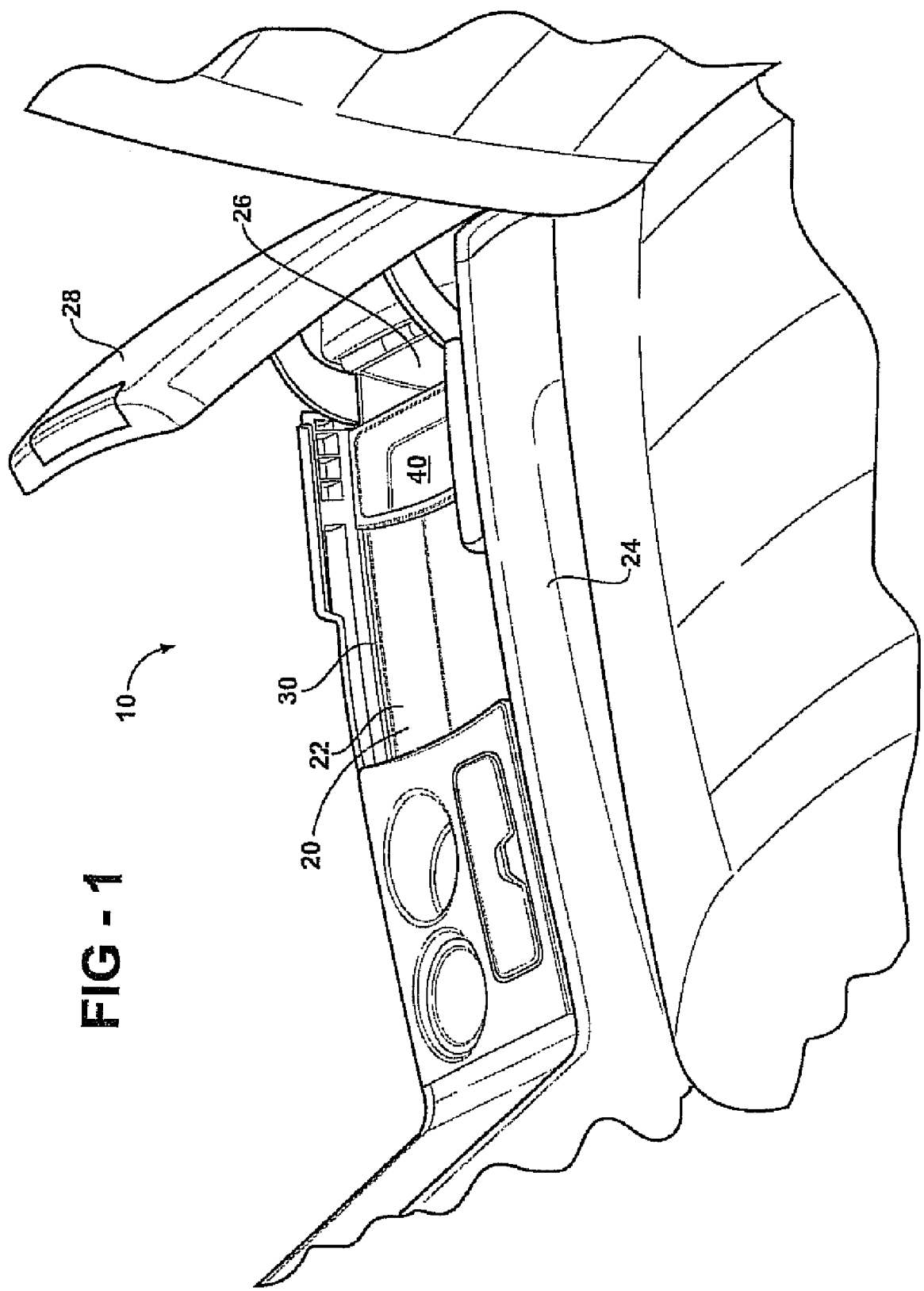

CENTER CONSOLE ASSEMBLY HAVING A RAMPED LOCATING TAB

FIELD OF THE INVENTION

The invention relates to a center console assembly for a motor vehicle. More particularly, the invention relates to a center console having a ramped locating tab that facilitates location of a sliding tray to a stored position.

BACKGROUND OF THE INVENTION

Motor vehicles typically include a center console assembly disposed along a longitudinal center line of the vehicle to provide a housing for the gear shifting and/or parking brake lever mechanisms, as well as to provide conveniences, such as cup holders, armrests, storage, etc. It remains desirable to provide an improved center console assembly for motor vehicles.

SUMMARY OF THE INVENTION

According to one aspect of the invention, a center console assembly for a motor vehicle includes a tray, a first side wall, a second side wall and a storage compartment extending between the first side wall and the second side wall. Each side wall has a top surface on which the tray is supported. A tab extends upwardly from the top surface of the first side wall and extends into a recess in the tray to hold the tray in a retained position and prevent sliding of the tray along the top surfaces of the first side wall and second side wall. The tab has an support surface spaced apart from the top surface of the first side wall. The support surface has opposite trailing and leading ends. The tab has a trailing surface extending between the trailing end of the support surface and the top surface of the first side wall. The tab has a leading surface extending between the leading end of the support surface and the top surface of the first side wall. The leading surface extends at an acute angle relative to the top surface of the first side wall to facilitate insertion of the tab into the recess as the tray is moved along the top surfaces toward the retained position.

According to another aspect of the invention, a center console assembly for a motor vehicle includes a pair of side walls generally parallel and spaced apart from each other; a storage compartment extending between the side walls; and a tray supported on the side walls. A tab extends outwardly from at least one of the side walls and extends into a recess formed in the tray to retain the tray in a retained position to prevent the tray from sliding along the side walls. The tab has a ramped leading surface that facilitates insertion of the tab into the recess as the tray is moved along the side walls toward the retained position.

BRIEF DESCRIPTION OF THE DRAWINGS

Advantages of the present invention will be readily appreciated as the same becomes better understood by reference to the following detailed description when considered in connection with the accompanying drawings, wherein:

FIG. 1 is a perspective view of a center console assembly for a motor vehicle according to an embodiment of the invention;

DETAILED DESCRIPTION OF THE INVENTION

Figure 2A:
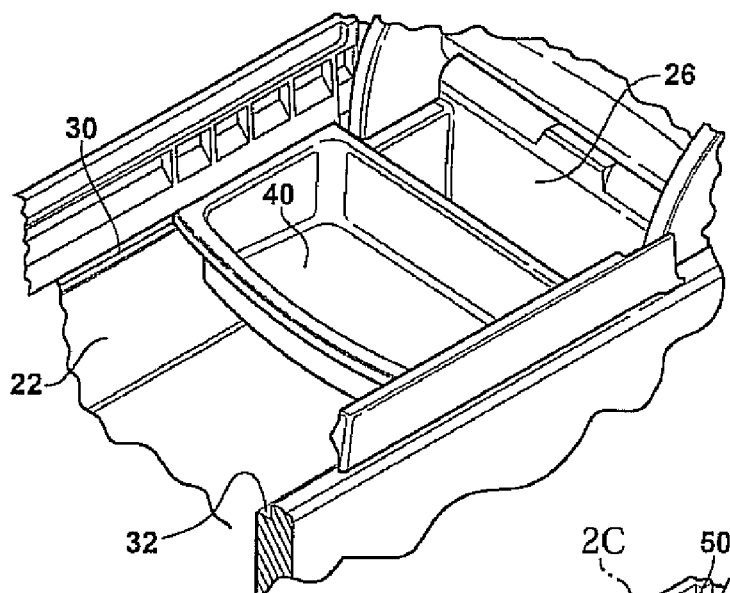
FIG. 2A is an enlarged perspective view of the center console assembly showing a tray in a retained position supported on side walls of the center console assembly.
Figure 2B:
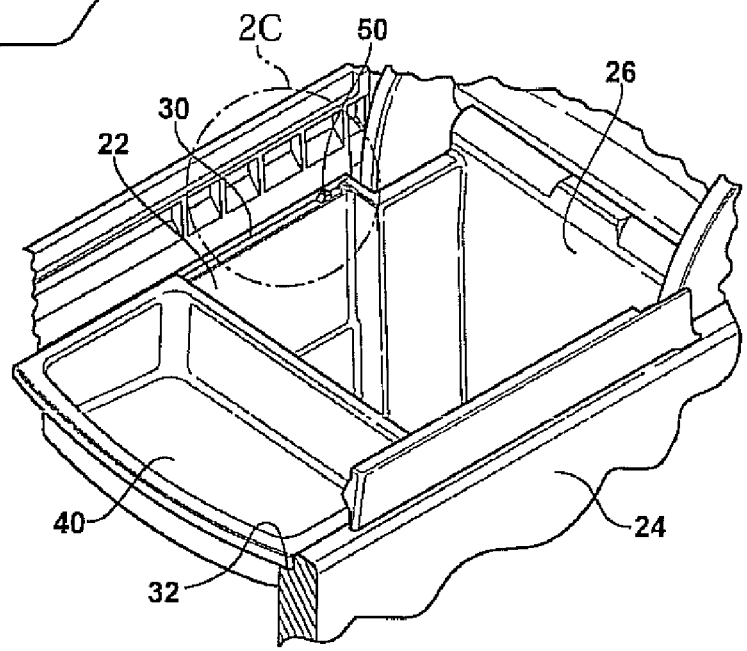
FIG. 2B is an enlarged perspective view of the center console assembly showing the tray out of the retained position and showing an upwardly extending tab for retaining the tray in the retained position.
Figure 2C:
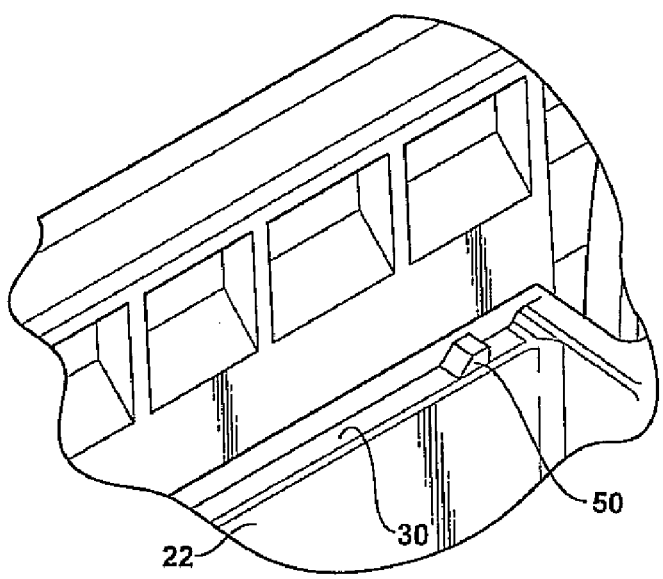
FIG. 2C is a perspective view of the center console assembly enlarged to show the tab.
Figure 3:
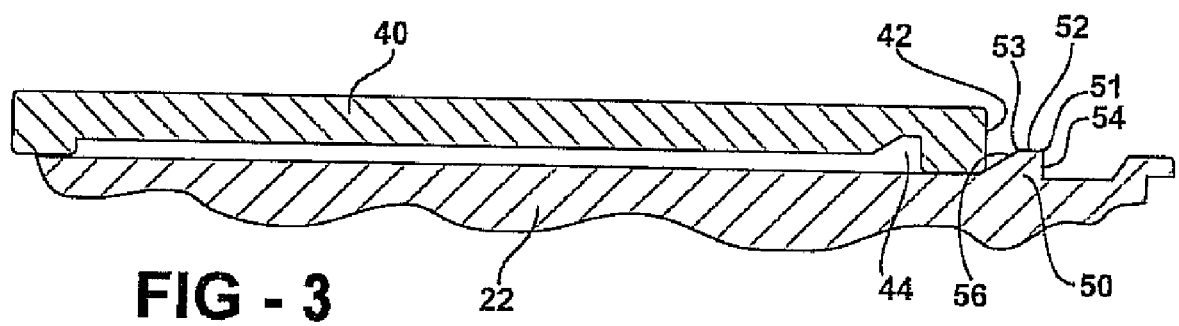
FIG. 3 is a cross sectional view of the center console assembly showing the tray just prior to engagement with a leading surface of the tab.

Referring to the FIGS. 1-5, a center console assembly 10 for a motor vehicle is generally indicated at 10. The center console assembly 10 includes a first side wall 22 and a second side wall 24. The first side wall 22 and the second side wall 24 are spaced apart from each other. A storage compartment extends between the first 22 and second 24 side walls. Each of the first 22 and second 24 side walls has a longitudinally extending top surface 30. The top surfaces 30 of the first 22 and second 24 side walls are generally parallel and/or generally coplanar relative to each other. The center console assembly 10 also includes a tray 40 supported on and slidable along the top surfaces 30 of the first 22 and second 24 side walls. A tab 50 extends upwardly from a top surface 30 of the first side wall 22. The tab 50 can extend into a recess 44 at a bottom surface of the tray 40 to retain the tray 40 in a retained position (FIG. 2A) and prevent sliding movement of the tray 40 along the top surfaces 30 of the first side wall 22 and second wall 24. In one embodiment of the invention, the recess 44 has a shape corresponding with the shape of the tab 50.

The tab 50 has an support surface 52 generally parallel and spaced apart from the top surface 30 of the first side wall 22. The support surface 52 has opposite trailing 51 and leading 53 ends. The tab 50 has a trailing surface 54 extending between the trailing end 51 of the support surface 52 and the top surface 30 of the first side wall 22. The trailing surface 54 extends generally orthogonally relative to the top surface 30 of the first side wall 22. The tab 50 has a leading surface 56 extending between the leading end 53 of the support surface 52 and the top surface 30 of the first side wall 22. In the illustrated embodiment, the leading surface 56 is substantially planar. The leading surface 56 is sloped at an acute angle relative to the top surface 30 of the first side wall 22 to facilitate movement of the tray 40 to the retained position with the tab 50 extending into the recess 44. In one embodiment, the leading surface 56 is angled between approximately 30 and 45 degrees relative to the top surface 30 of the first side wall 22. The effort required to move the tray 40 over the tab 50 increases considerably when the leading surface 56 is angled beyond 45 degrees relative to the top surface 30. Additionally, a leading surface 56 of less than 30 degrees relative to the top surface 30 can result in an undesirably long leading surface 56 and/or short tab 50. Thus, there is appreciable criticality in providing a leading surface 56 at an angle between 30 and 45 degrees relative to the top surface 30 of the first side wall 22.

In use, the tray 40 is supported on the top surfaces 30 of the first side wall 22 and second side wall 24. The tray 40 is also slidable along the top surfaces 30 of the first side wall 22 and second side wall 24 for convenient placement and use of the tray 40 by a user. During driving, however, it is possible for the tray 40 to slide unintentionally along the top surfaces 30 of the first 22 and second 24 side walls. To prevent sliding of the tray 40 along the top surfaces 30, the user may position the tray 40 on the top surfaces 30 such that the tab 50 extends into the recess 44 at the bottom of the tray 40. Contact between the tab 50 and the surfaces of the tray 40 within the recess 44 prevents sliding movement of the tray 40 along the top surfaces 30 and retains the tray 40 in the retained position.

Figure 4:
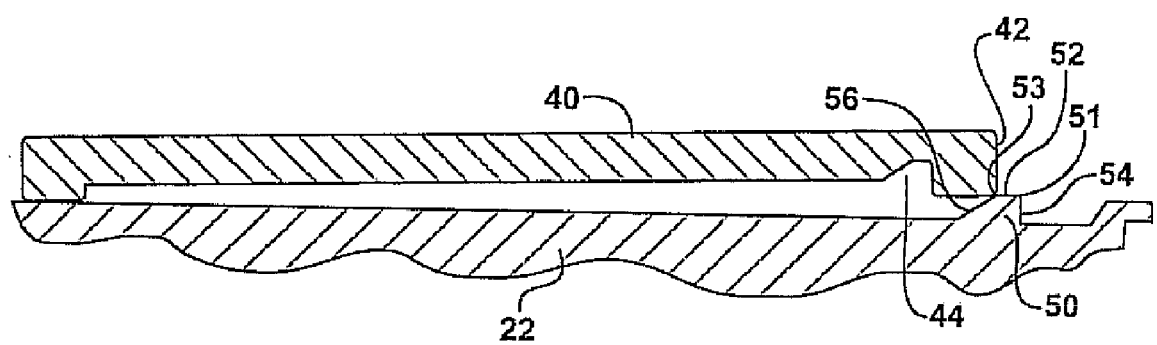
FIG. 4 is a cross sectional view of the center console assembly showing the tray engaged with the leading surface of the tab as the tray is being moved toward the retained position.
Figure 5:
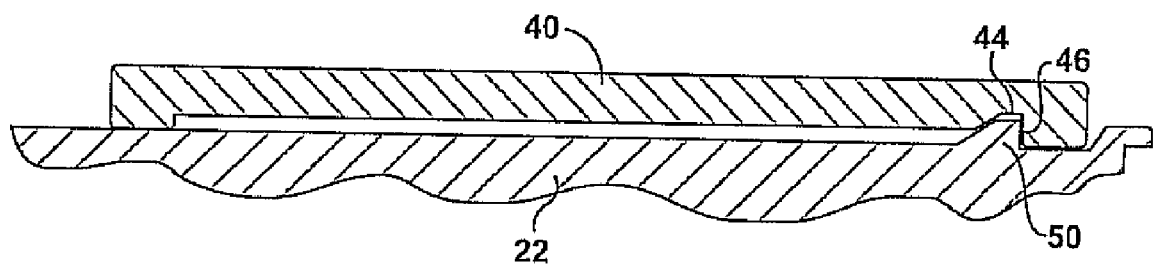
FIG. 5 is a cross sectional view of the center console assembly showing the tray in the retained position.

To facilitate location and insertion of the tab 50 into the recess 44, the leading surface 56 of the tab 50 is ramped or angled at an acute angle relative to the top surface 30 of the first side wall 22. The angled leading surface 56 contacts a rear portion or surface 42 of the tray (FIG. 3) as the tray 40 is moved toward the tab 50 causing the rear end of the tray 40 to lift upwardly from the top surfaces 30 (FIG. 4). Continued movement of the tray 40 toward the tab 50 allows the recess 44 to align with the tab 50, at which point, the tab 50 enters the recess 44 and allows the tray 40 to return to a resting position along the top surfaces 30 of the side walls 22, 24 (FIG. 5). The tab 50 extends in the recess 44 and prevents movement of the tray 40 along the top surfaces 30 of the side walls 22, 24.

In another embodiment, the tab 50 is spaced apart from a end wall 26 that is generally orthogonal relative to the side walls 22, 24 such that the tray 40 or at least a portion of the tray 40 can be located or retained between the trailing surface 54 of the tab 50 and the end wall 26.

In yet another embodiment, a door 28 is pivotally coupled to the end wall 26 for movement between a closed position covering the tray 40 and the storage compartment 20 and an open position allowing access to the tray 40 and/or storage compartment 20.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A center console assembly for a motor vehicle, said center console assembly comprising:
   a tray;
   a first side wall, a second side wall and a storage compartment extending between the first side wall and the second side wall, each side wall having a top surface on which the tray is supported; and
   a tab extending upwardly from the top surface of the first side wall and extending into a recess in the tray to hold the tray in a retained position and prevent sliding of the tray along the top surfaces of the first side wall and second side wall, the tab having a support surface spaced apart from the top surface of the first side wall, the support surface having opposite trailing and leading ends, the tab have a trailing surface extending between the trailing end of the support surface and the top surface of the first side wall, the tab having a leading surface extending between the leading end of the support surface and the top surface of the first side wall, the leading surface extending at an acute angle relative to the top surface of the first side wall to facilitate insertion of the tab into the recess as the tray is moved along the top surfaces toward the retained position.

2. The center console assembly as set forth in claim 1, wherein the support surface of the tab is generally parallel with the top surface of the first side wall.

3. The center console assembly as set forth in claim 2, wherein the trailing surface of the tab is generally orthogonal relative to the top surface of the first side wall.

4. The center console assembly as set forth in claim 3, wherein the leading surface is sloped at an angle ranging between thirty and forty five degrees relative to the top surface of the first side wall.

5. The center console assembly as set forth in claim 4, wherein the leading surface is substantially planar.

6. The center console assembly as set forth in claim 3 including an end wall extending generally orthogonally between the first side wall and the second side wall.

7. The center console assembly as set forth in claim 6, wherein at least a portion of the tray is constrained between the end wall and the trailing surface of the tab to retain the tray in the retained position.

8. The center console assembly as set forth in claim 7, wherein the end wall and trailing surface are generally parallel to each other.

9. The center console assembly as set forth in claim 7 including a lid pivotally coupled to the end wall for movement between a closed position covering the tray and storage compartment and an open position allowing access to the tray and storage compartment.

10. The center console assembly as set forth in claim 1, wherein the top surfaces of the first and second side walls are generally parallel to each other.

11. The center console assembly as set forth in claim 10, wherein the top surfaces of the first and second side walls are generally co-planar.

12. A center console assembly for a motor vehicle, said center console assembly comprising:
    a pair of side walls generally parallel and spaced apart from each other;
    a storage compartment extending between the side walls each side wall having a top surface;
    a tray supported on the top surfaces of the pair of side walls; and wherein at least one of the side walls includes a tab
    the tab extending into a recess formed in the tray to retain the tray in a retained position to prevent the tray from sliding along the side walls, the tab having a ramped leading surface that facilitates insertion of the tab into the recess as the tray is moved along the side walls toward the retained position.

13. A center console assembly as set forth in claim 12, wherein the leading surface extends at an acute angle relative to the direction in which the tray is moved along the side walls toward the retained position, the leading surface contacting the tray as it is moved toward the retained position and causing a portion of the tray to lift from the side wall to facilitate insertion of the tab into the recess in the tray.

14. A center console assembly as set forth in claim 12, wherein the leading surface extends at an angle ranging between thirty degrees and forty five degrees relative to the direction in which the tray is moved along the side walls toward the retained position, the leading surface contacting the tray as it is moved toward the retained position and causing a portion of the tray to lift from the side wall to facilitate insertion of the tab into the recess in the tray.

* * * * *